Patented May 27, 1952

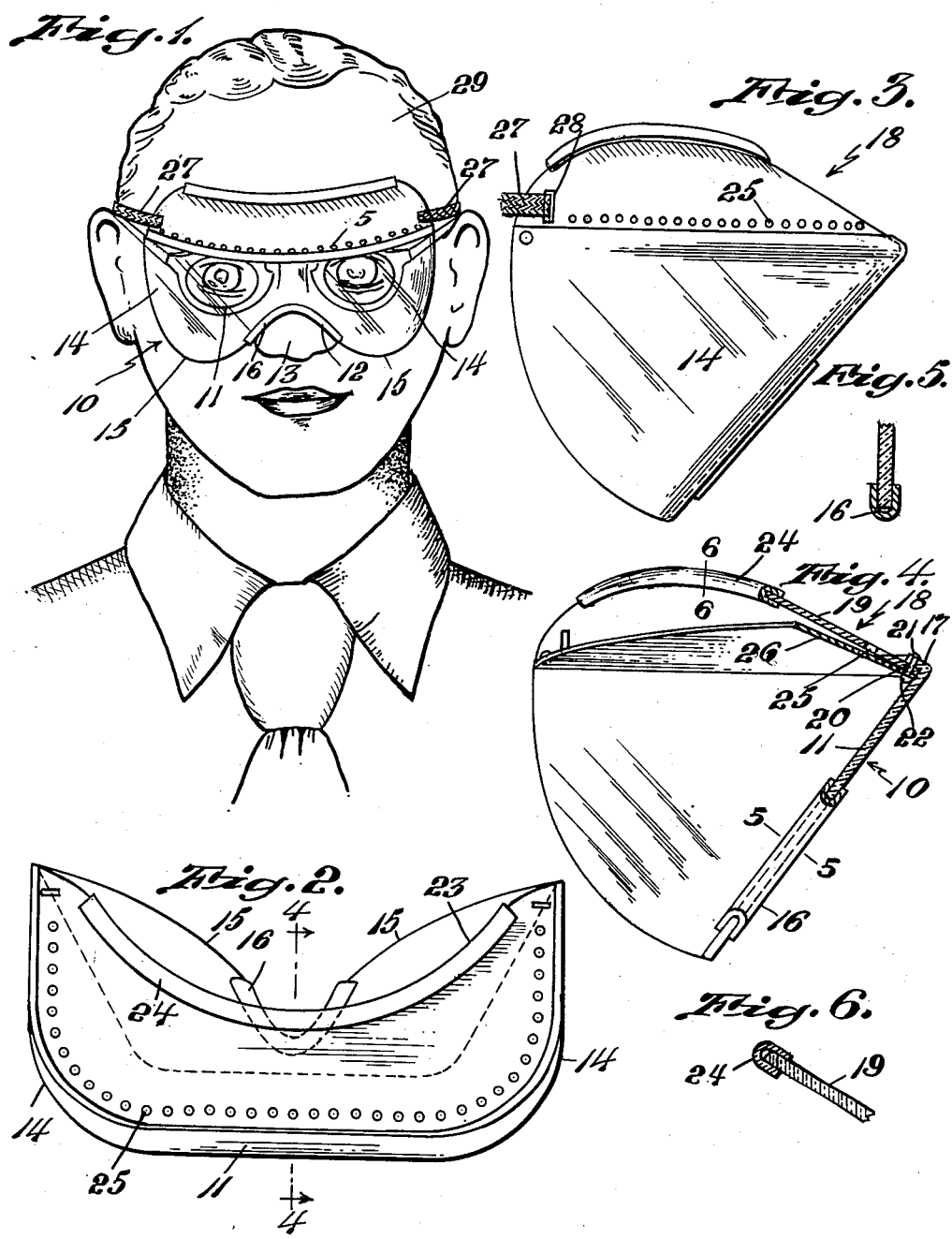

2,598,265

UNITED STATES PATENT OFFICE 2,598,265

GOGGLE

Arthur Kenyon Jones, Rumford, R. I.

Application November 18, 1950, Serial No. 196,397

2 Claims. (Cl. 2—14)

This invention relates to a goggle which will be sufficiently strong and durable to be suitable for industrial protection of the eyes.

One of the objects of this invention is to provide a goggle which will be so shaped that it may be placed over glasses which are usually used and will protect the glasses as well as the eyes and parts of the face about the eyes from flying particles.

Another object of this invention is to so form the goggle that it will shield the eyes from light glare.

Another object of this invention is to provide a goggle which will have ventilation sufficient to prevent fogging of the goggle by reason of the trapping of heat within the same.

Another object of this invention is to provide a goggle which will provide substantially perfect vision from all angles through which objects may be viewed.

Another object of this invention is to provide a goggle which will be so shaped that its strength to resist impact will be materially increased.

Another object of this invention is to provide a goggle which will be comfortable to wear.

With these and other objects in view, the invention consists of certain novel features of construction, as will be more fully described and particularly pointed out in the appended claims.

In the accompanying drawings:

Figure 1 is a face view of a person wearing the goggle, which is the subject of this invention;

Figure 2 is a top plan of the goggle as seen in Figure 1;

Figure 3 is an end view of the goggle shown in Figure 1;

Figure 4 is a sectional view on line 4—4 of Figure 2;

Figure 5 is a sectional view on line 5—5 of Figure 4;

Figure 6 is a sectional view on line 6—6 of Figure 4.

In proceeding with this invention, I provide a substantially flat transparent section which is notched to receive the nose and provided with rearwardly extending wings at either end of the flat section which is positioned before the eyes at an angle to a perpendicular to the line of sight, and I provide a visor section extending rearwardly from the upper edge of this lens section, which is ventilated and provided with a shield beneath the ventilations to prevent the passage of light to the eyes. The visor is of such rearward extent as to position the upper edge of the lens section outwardly from the forehead that the desired angular relation may be provided. The shield section is also so curved as to fit the lens section and is curved at its rear edge to fit the forehead. A suitable strap is provided for holding the goggle on the head and the size of the goggle is such as to receive within it the ordinary glasses which may be worn by a person.

With reference to the drawings, the lens section is designated generally 10 and is formed of methyl methacrylate which is transparent. The lens section is flat along its front as at 11 where it extends directly in front of the eyes, as viewed in Figure 1 and which may be very readily viewed in Figure 2. This flat section is notched as at 12 so as to receive the nose 13 of the wearer therein. At either side of this flat portion of the section, the section is curved rearwardly to provide wings 14. The entire lens section is shaped along its edges 15 at either side of the nose-receiving notch so as to closely fit the face of the wearer and this edge will be rounded so as to afford comfort when contacting the face of the wearer. In order to provide a broader area of contact at the nose-engaging notch 12, there is added a generally U-shaped strip 16, as seen in Figures 1 and 5, to increase the bearing surface at this nose-engaging portion. The upper edge of the lens section extends rearwardly to provide a lip 17, as seen in Figure 4, for purposes of receiving the visor section to be presently described.

The visor section is designated generally 18 and comprises a flat central portion 19 which has its front edge closely shaped to fit along the lens section 10 and beneath the lip 17, it being secured to this lip by bolts 20 having a head 21 on the outer surface of the lip and a nut 22 to bind the visor section to the lip. The rear edge of this visor section is shaped as at 23 to conform to and closely fit the forehead with a U-shaped portion 24 to enlarge the edge at its point of greatest pressure on the forehead for greater comfort. This visor would be formed of cellulose acetate which may be opaque or may be coated to cause the same to be opaque, and which opaque coating will provide on the under surface of this visor a dull finish which will tend to absorb rather than reflect light. This visor is provided with a plurality of holes 25 at its forward edge so that air may freely circulate through these holes, and in order to block any light which may be transmitted through these holes, an inner shield 26 of a width extending from the lens to a distance substantially back of the holes 25 is secured in spaced relation to the visor 18 so as to permit circulation of air through the holes but to block the passage of light from the holes to the eyes. One convenient manner of securing this shield is to position it to receive the bolts 20 which secure the visor to the lens.

In order to hold the goggle on the face, I have provided an elastic band 27 which is secured through slots 28 in the visor section and which may be passed about the head 29, as shown in Figure 1.

The lens section will usually be formed of clear shatter proof plastic material for industrial use and will fit over a person's glasses, if a person wears glasses, and protect the glasses as well as the eyes and portion of the face about the eyes. This goggle is adapted for industrial use as the methyl methacrylate material does not shatter, and the angle at which the goggle is located with relation to the face adds to the strength characteristics, as the angle and curvature tend to throw off particles which may be directed toward the eyes due to angular impact rather than impact at right angles to the surface where greater strength is necessary. The visor and shield being opaque prevents the entrance of light from above which might cause a back lighting or glaring on the highly polished surface of the lens section. The nuts and bolts permit of easy interchanging of lenses, should a lens become scratched.

In cases where the goggle is to be used for skiing or where high outer glare is to be experienced, such as in bright sunlight on the snow, the lens section may be of a tinted methyl methacrylate material to cut down this glare. Different degrees of tinting or light obstruction may be a part of the lens section where filtering of the light is desirable. A very dark lens may be provided for welders. Different sorts of lenses may be maintained on hand and interchanged, adapting the goggle for different uses. Due to the flat formation of the lens, there is no distortion in the ordinary use of the goggles.

I claim:
1. A goggle comprising a lens section having a flat front surface with a recess at the middle of its lower edge to receive the nose and with rearwardly curved wings at either side of its flat front, said front and wings being a single piece of transparent material, and a visor section extending from the upper edge of the lens section rearwardly along and in contact with the upper edges of the wings at an acute angle to the lens section with its rear edge arched to receive the forehead of the user, said visor section having a rearward extension sufficient to position the flat portion of the lens section at an angle to a perpendicular to the line of vision, said visor section being opaque to shield against the transmission of light, one of said sections being provided with a molded lip to extend over the other section and detachable fastening means securing the lip and other section together.

2. A goggle as in claim 1 wherein said visor section is perforated for ventilation and an opaque shield spaced from the visor section is secured to said sections to block the passage of light which enters the perforations.

ARTHUR KENYON JONES.

REFERENCES CITED

The following references are of record in the file of this patent:

UNITED STATES PATENTS

| Number | Name | Date |
|---|---|---|
| 857,689 | Tileston | June 25, 1907 |
| 2,233,600 | Glasberg | Mar. 4, 1941 |
| 2,409,243 | Bernheim et al. | Oct. 15, 1946 |

FOREIGN PATENTS

| Number | Country | Date |
|---|---|---|
| 634,093 | France | Nov. 8, 1927 |
| 685,935 | France | Apr. 7, 1930 |